(12) United States Patent
Imai

(10) Patent No.: US 8,331,661 B2
(45) Date of Patent: Dec. 11, 2012

(54) IMAGE PROCESSING APPARATUS AND IMAGE PROCESSING METHOD

(75) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 12/861,229

(22) Filed: Aug. 23, 2010

(65) Prior Publication Data

US 2011/0075923 A1 Mar. 31, 2011

(30) Foreign Application Priority Data

Sep. 28, 2009 (JP) ................................. 2009-223462

(51) Int. Cl.
*G06K 9/00* (2006.01)

(52) U.S. Cl. ...................................................... 382/162

(58) Field of Classification Search .......... 382/162–167; 358/1.9, 2.1, 3.01, 3.23, 518–522; 345/589–604
See application file for complete search history.

(56) References Cited

U.S. PATENT DOCUMENTS

| 6,885,394 | B1 | 4/2005 | Noguchi | |
|---|---|---|---|---|
| 7,327,876 | B2 * | 2/2008 | Hoshuyama | 382/167 |
| 7,564,604 | B2 * | 7/2009 | Shirasawa | 358/529 |
| 7,612,914 | B2 * | 11/2009 | Ito et al. | 358/1.9 |
| 7,948,657 | B2 * | 5/2011 | Yanai et al. | 358/3.01 |
| 7,952,757 | B2 * | 5/2011 | Kaneko et al. | 358/1.9 |
| 8,130,415 | B2 * | 3/2012 | Yanai et al. | 358/2.1 |
| 8,154,762 | B2 * | 4/2012 | Imai | 358/1.9 |
| 2008/0170278 | A1 | 7/2008 | Imai | |

FOREIGN PATENT DOCUMENTS

| JP | 2000-333186 | 11/2000 |
|---|---|---|
| JP | 2002-221931 | 8/2002 |
| JP | 2006-287585 | 10/2006 |

* cited by examiner

*Primary Examiner* — Ishrat I Sherali

(74) *Attorney, Agent, or Firm* — Fitzpatrick, Cella, Harper & Scinto

(57) ABSTRACT

An image processing apparatus that separates image data in an N-dimensional first signal format (3<N) into image data in a second signal format is provided. The second signal format is used in an image output apparatus. The apparatus comprises an input unit for acquiring input image data in the first signal format; a conversion unit for converting the input image data in the first signal format into image data in an M-dimensional third signal format (3<M≦N); and a color separation unit for separating the converted image data in the third signal format into image data in the second signal format, using an M-dimensional color separation LUT. With respect to a pixel distribution, a correlation between each component of the third signal format data is lower than a correlation between each component of the first signal format data.

12 Claims, 9 Drawing Sheets

FIG. 1
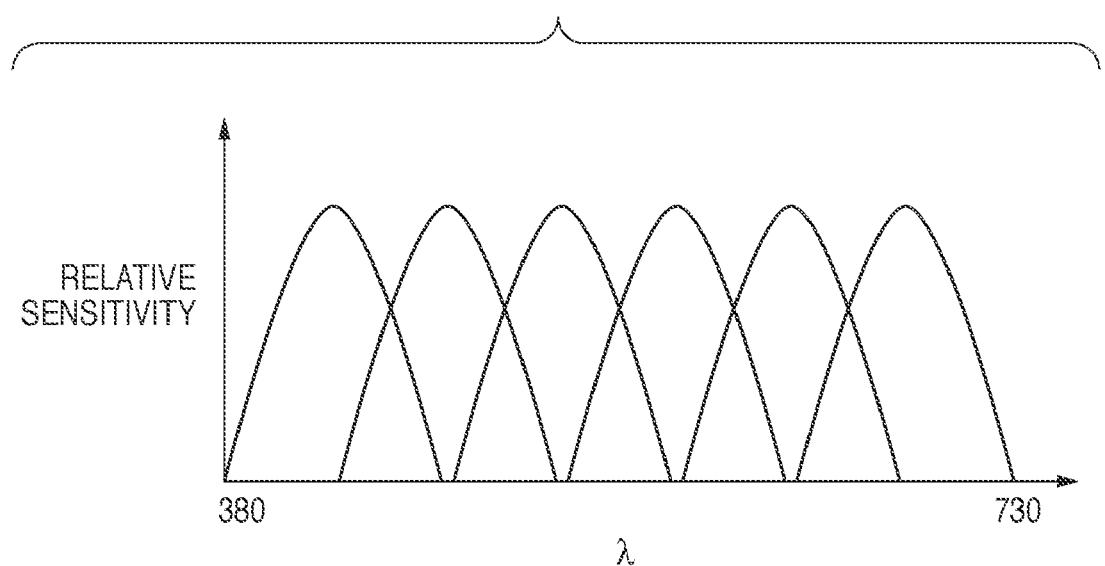
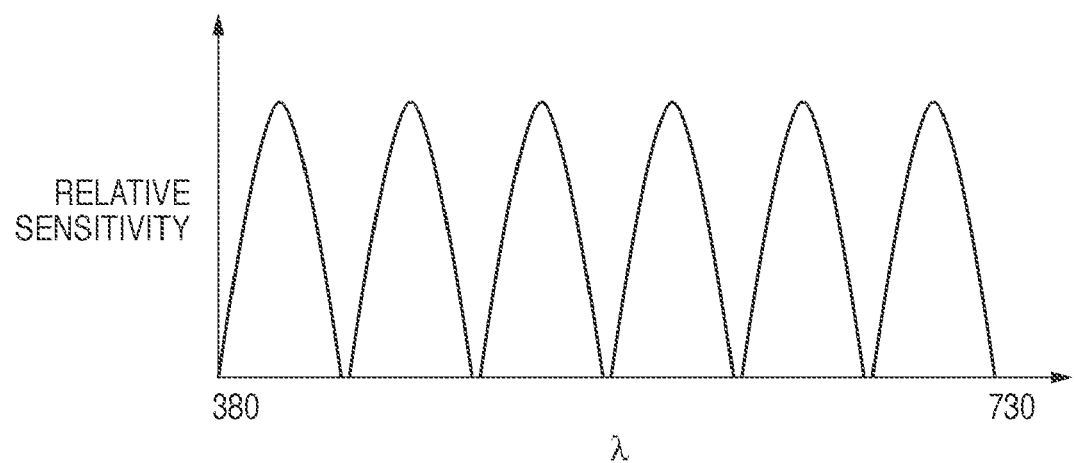

| PATCH No. | Cyan | Magenta | Yellow | Black | Red | Green | Blue |
|---|---|---|---|---|---|---|---|
| 1 | 0 | 0 | 0 | 0 | 0 | 0 | 0 |
| 2 | 0 | 0 | 0 | 0 | 0 | 0 | 25% |
| 3 | 0 | 0 | 0 | 0 | 0 | 0 | 50% |
| 4 | 0 | 0 | 0 | 0 | 0 | 0 | 75% |
| 5 | 0 | 0 | 0 | 0 | 0 | 0 | 100% |
| 6 | 0 | 0 | 0 | 0 | 0 | 25% | 0 |
| ... | ... | ... | ... | ... | ... | ... | ... |
| 78124 | 100% | 100% | 100% | 100% | 100% | 100% | 75% |
| 78125 | 100% | 100% | 100% | 100% | 100% | 100% | 100% |

FIG. 7

| LUT INPUT AXIS | INPUT DATA | DYNAMIC RANGE | THE NUMBER OF GRID POINTS | GRID INTERVAL |
|---|---|---|---|---|
| 1 | CHANNEL 1 | 65535 | 9 | 8192 |
| 2 | CHANNEL 2 | 65535 | 9 | 8192 |
| 3 | CHANNEL 3 | 65535 | 9 | 8192 |
| 4 | CHANNEL 4 | 65535 | 9 | 8192 |
| 5 | CHANNEL 5 | 65535 | 9 | 8192 |
| 6 | CHANNEL 6 | 65535 | 9 | 8192 |
| TOTAL | | | 531441 | |

| LUT INPUT AXIS | INPUT DATA | DYNAMIC RANGE | THE NUMBER OF GRID POINTS | GRID INTERVAL |
|---|---|---|---|---|
| 1 | FIRST PRINCIPAL COMPONENT | 104147.3 | 14 | 8011.38 |
| 2 | SECOND PRINCIPAL COMPONENT | 35841.8 | 6 | 7168.40 |
| 3 | THIRD PRINCIPAL COMPONENT | 31985.7 | 5 | 7996.50 |
| 4 | FOURTH PRINCIPAL COMPONENT | 31457.5 | 5 | 7864.50 |
| 5 | FIFTH PRINCIPAL COMPONENT | 17906.07 | 4 | 5969.00 |
| 6 | SIXTH PRINCIPAL COMPONENT | 13546.16 | 3 | 6773.50 |
| TOTAL | | | 25200 | |

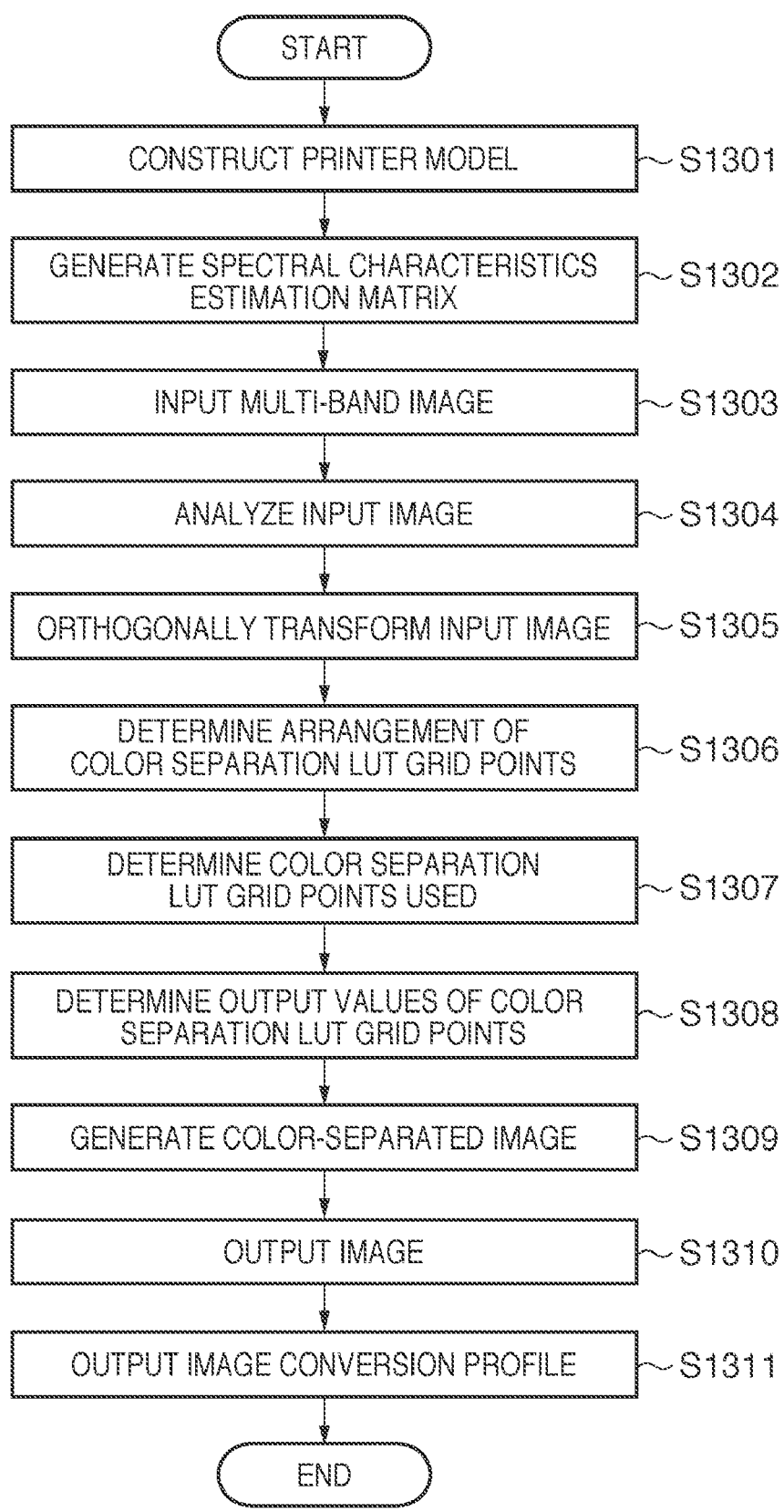

IMAGE PROCESSING APPARATUS AND IMAGE PROCESSING METHOD

BACKGROUND OF THE INVENTION

1. Field of the Invention

The present invention relates to an image processing apparatus and an image processing method in which a multi-band image taken with a multi-band camera is color-separated for output to an image output apparatus.

2. Description of the Related Art

Digitization of images in recent years has increased opportunities where an image acquired by an image input device such as a digital camera or a scanner is displayed with an image display apparatus such as a monitor or a projector, or printed with an image output apparatus such as an ink-jet printer or a laser printer.

Generally, in color reproduction techniques for reproducing colors of an object, an image input device acquires color information by separating original colors into three primary colors with filters of three colors, RGB. On the other hand, an image display device reproduces the original colors by performing an additive process using light emitters for three colors, RGB. An ink-jet printer and a laser printer reproduce the original colors by performing a subtractive process using colorants of four colors, CMYK.

Input/output of images is currently performed with various devices in various environments. For example, it is common for an image of an object to be acquired with a digital camera outdoors under sunlight, and the image printed out indoors to be viewed under a fluorescent lamp. Now, demands for faithfully reproducing original colors are increasing, especially in fields of professional use such as for camerapersons and designers. However, as described above, faithfully reproducing original colors in situations where the device/environment at the time of input is different from the device/environment at the time of output, requires strict management of color information.

Specifically, if different viewing illuminants are applied at the time of input and at the time of output, for example, if an image is taken under sunlight at a color temperature of about 5000 K and the printed image is viewed under an indoor electric lamp at a color temperature of about 3000 K, it is extremely difficult to faithfully reproduce original colors. The reason for this is as follows. In the above-described colorimetric color reproduction using the three primary colors, three tristimulus values including illuminant information (XYZ values or Lab values) are matched. Therefore, if different illuminants are applied at the time of input and at the time of output, a color matching relation is not established.

Accordingly, as a technique to faithfully reproduce original colors in various environments, a technique called spectral-based color reproduction has drawn attention in recent years. The spectral-based color reproduction is a technique of faithfully reproducing original colors of an object under any illuminant by matching the reflectance for each light wavelength (spectral reflectance) as well, rather than reproducing the colors of the object by matching the tristimulus values.

For example, according to Japanese Patent Laid-Open No. 2002-221931, an image input apparatus employing six types of filters is used to acquire a 6-channel image. The spectral reflectance of the object is estimated with Wienner estimation or the like and converted into a signal value of each of RGB channels of a display apparatus closest to the estimated spectral reflectance.

As another example, according to Japanese Patent Laid-Open No. 2000-333186, multi-channel filters are used to acquire a multi-band image of an object. The spectral reflectance of each pixel is computed and converted into RGB values of an output apparatus.

As an expansion of these techniques, an approach is also known in which apparatus such as a multi-band monitor, a multi-band projector, and a multi-color printer are used as output apparatus, and the spectral reflectance is converted into signal values for the respective output apparatus.

Typically, a band-pass filter that transmits only a particular band (wavelength range) is employed as a color filter used for each channel of an input apparatus. Representative types of band-pass filters include a gelatin filter, a pigment filter, a liquid crystal tunable filter, and an interference filter. Among these filters, the gelatin filter and the pigment filter are relatively inexpensive but transmit a wide bandwidth. The liquid crystal tunable filter and the interference filter are capable of narrowing the transmitted bandwidth, but they are costly compared with the gelatin filter and the pigment filter.

Here, the influence of the transmitted bandwidth of band-pass filters on the spectral sensitivity will be described. FIG. 1 shows examples of the spectral sensitivity of each channel when a multi-band input apparatus with six bands is constructed: an upper diagram illustrates a case where wide-bandwidth filters are used, and a lower diagram illustrates a case where narrow-bandwidth filters are used. With the wide bandwidth as shown in the upper diagram of FIG. 1, overlaps occur in transmitted band ranges of adjacent channels. The more channels the multi-band input apparatus has and the wider the bandwidth is, the wider the overlapping areas are. On the other hand, with the narrow bandwidth as shown in the lower diagram of FIG. 1, the overlaps of the spectral sensitivity between the channels decrease. However, since the amount of light transmitted by the filter for each channel decreases, an input image is susceptible to noise.

Therefore, associating input signals with output signals without involving spectrum information is contemplated. For example, Japanese Patent Laid-Open No. 2006-287585 discloses a technique in which a patch image output from an output apparatus is multi-band imaged, and a multi-dimensional look-up table (hereinafter referred to as LUT) that associates input signals with output signals of each pixel is generated. This allows converting input signals into output signals without involving the spectral reflectance as intermediate data, thereby reducing the occurrence of errors in the conversion processing. In addition, performing the LUT processing allows reducing the amount of computation required for the conversion processing.

A method is also known in which the spectral reflectance is computed with Winner estimation or the like for each grid point of the LUT and converted into a signal value of each channel of an output apparatus closest to the computed spectral reflectance.

As described in the above Japanese Patent Laid-Open No. 2002-221931 and Japanese Patent Laid-Open No. 2000-333186, the conventional spectral color reproduction techniques estimate the spectral reflectance of image data acquired with a multi-channel multi-band camera and then convert the spectral reflectance into signal values for an output apparatus. However, if, for example, the spectral reflectance data is sampled at 10 nm intervals in the range of 380 nm to 730 nm, 36-dimensional data must be handled for each color. This results in an enormous amount of CPU computation time and a huge memory size used, posing a problem of the difficulty to perform spectral color reproduction of natural images.

A technique described in Japanese Patent Laid-Open No. 2006-287585 uses a multi-dimensional LUT in which signal values of each channel of a multi-band input apparatus form an input value space. However, if wide-bandwidth filters are used in the input apparatus in order to address noise, the correlation between signals of adjacent channels becomes strong. Assuming that input signals are normalized in the range of 0 to 1, the input signals concentrate around a diagonal line connecting "a grid point where all signals are 0" and "a grid point where all signals are 1" in the multi-dimensional LUT. In other words, performing principal component analysis on the pixel distribution yields the first principal component around the diagonal direction of the LUT. This results in a drawback in that, although most of grid points apart from the diagonal line of the multi-dimensional LUT are not used for image processing, the data size of the LUT becomes huge. The excessively large data size of the LUT also has drawbacks such as a reduced speed of the LUT processing, or inability to obtain a sufficient grid point density for required accuracy. If the spectral reflectance of each grid point of the LUT is computed with Winner estimation or the like, the strong correlation between signals of adjacent channels causes reduced accuracy when the spectral reflectance is estimated based on input signal values that are out of the correlation. In this case, a reflectance smaller than 0 or greater than 1 may be computed.

Thus, in a multi-dimensional LUT in which input values form the input color space, the estimation accuracy tends to be lower for grid points farther from around the first principal component, that is, the diagonal line. Here, it is assumed that N-dimensional LUT conversion with a uniform grid point interval d on each axis is performed for an input signal value located at a distance x from the diagonal line. Then a grid point at a position distant by $x+d\sqrt{N}$ at the maximum in the direction orthogonal to the diagonal line is used. Therefore, there is a drawback in that performing the LUT processing starting from a grid point with relatively poor estimation accuracy of the spectral reflectance reduces the image conversion accuracy.

On the other hand, if a narrow-bandwidth filter is used for each channel of the input apparatus, an input image is susceptible to noise as described above. Therefore, again, there is a drawback of reduced image reproduction accuracy.

The present invention has been made for solving the above issues and provides an image processing apparatus and an image processing method in which an N-dimensional image (3<N) of a multi-band imaged object is color-separated with a high speed and accuracy and a small amount of memory use to enable color reproduction that is faithful to the object.

SUMMARY OF THE INVENTION

According to an aspect of the present invention, image processing apparatus that separates image data in an N-dimensional first signal format, where 3<N, into image data in a second signal format, the second signal format indicating the amount of a colorant of each color used in an image output apparatus, the apparatus comprising: an input unit configured to acquire input image data in the first signal format; a conversion unit configured to convert the input image data in the first signal format into image data in an M-dimensional third signal format, where 3<M≦N; and a color separation unit configured to separate the converted image data in the third signal format into image data in the second signal format, using an M-dimensional color separation LUT whose input values are in the third signal format and whose output values are in the second signal format, wherein with respect to a pixel distribution, a correlation between each component of the converted image data in the third signal format is lower than a correlation between each component of the input image data in the first signal format.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram showing examples of the spectral sensitivity of each channel of a multi-band input apparatus with six bands in the case of using wide-bandwidth filters and the case of using narrow-bandwidth filters;

FIG. 7 is a diagram describing an exemplary color separation LUT generated in the first embodiment;

FIG. 9 is a flowchart showing exemplary image conversion processing in the second embodiment.

DESCRIPTION OF THE EMBODIMENTS

Embodiments of the present invention will be described below with reference to the drawings. The embodiments below are not intended to limit the present invention set forth in claims, and not all combinations of features described in the embodiments are necessarily essential to the solution of the present invention.

<First Embodiment>
System Configuration

Figure 2:
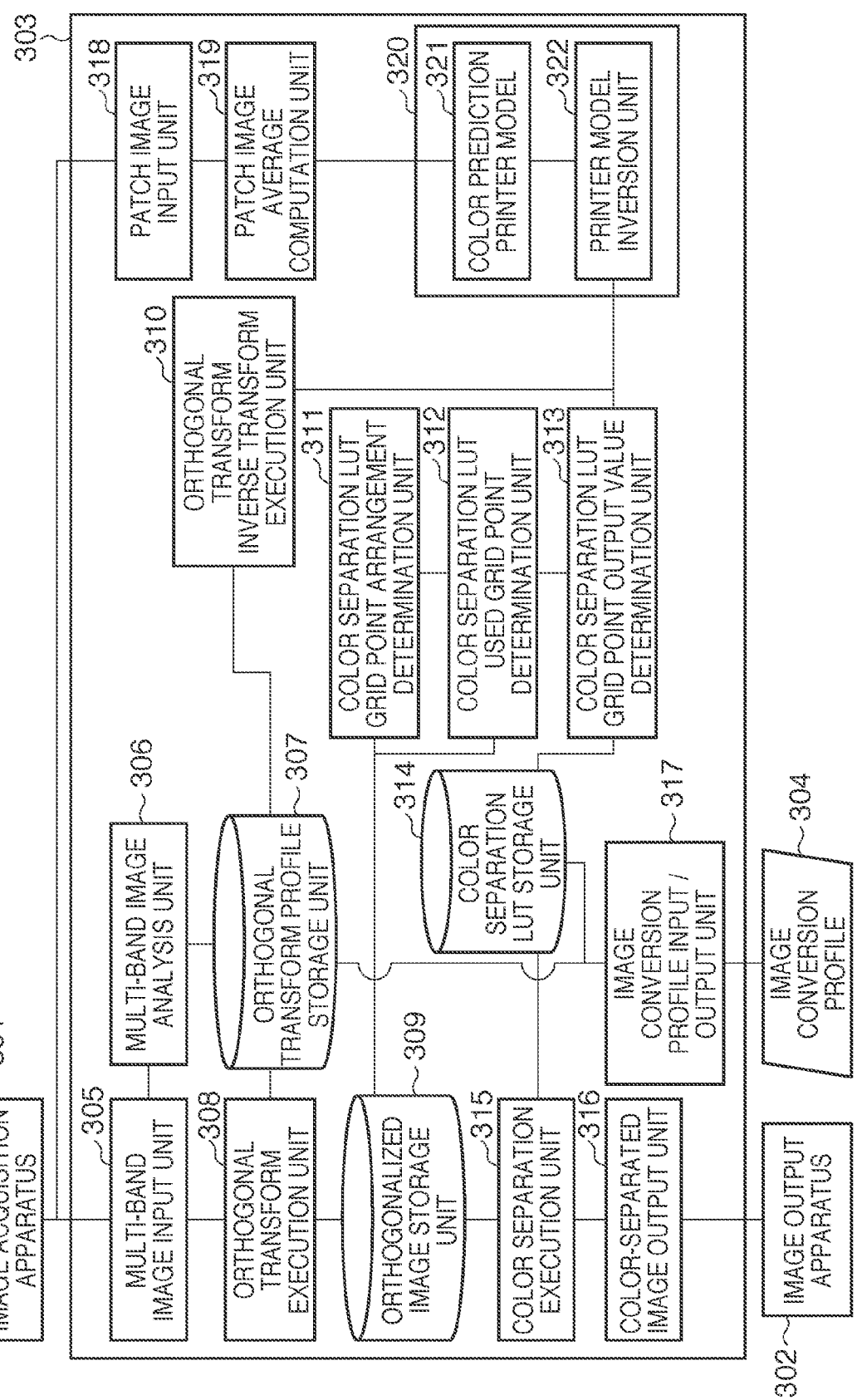
FIG. 2 is a block diagram showing an exemplary configuration of an image processing system in a first embodiment.

In an image processing system in this embodiment, N-dimensional multi-band image data, which is input image data in a first signal format, is converted into image data in a second signal format indicating the amount of a colorant of each color to be used in an image output apparatus. FIG. 2 is a block diagram showing an exemplary configuration of the image processing system in this embodiment. In FIG. 2, reference numeral 301 denotes a multi-band image acquisition apparatus, such as a multi-band camera, for acquiring colors of an object by using a multi-primary color filter. Reference numeral 302 denotes an image output apparatus, such as a color ink-jet printer, that actually outputs an image. Reference numeral 303 denotes an image processing apparatus that performs image conversion processing in the present invention. Reference numeral 304 denotes an image conversion profile in which details of the image conversion processing performed by the image processing apparatus 303 are stored in a reusable data format.

An internal configuration of the image processing apparatus 303 will be described below. Reference numeral 305 denotes a multi-band image input unit that controls the multi-band image acquisition apparatus 301 or a storage device associated therewith to input multi-band image data to be subjected to the image conversion. That is, the multi-band image input unit 305 inputs image data in a six-channel multi-band format, which is the first signal format, imaged by the multi-band image acquisition apparatus.

Reference numerals 306 to 309 are components for orthogonally transforming the multi-band image data in the first signal format to generate image data in a third signal format. Reference numeral 306 denotes a multi-band image analysis unit that analyzes the input multi-band image data and generates an orthogonal transform profile for converting the six-channel data of the input image into less correlated data. Reference numeral 307 denotes an orthogonal transform profile storage unit that temporarily stores the orthogonal transform profile generated by the multi-band image analysis unit 306. Reference numeral 308 denotes an orthogonal transform execution unit that applies the orthogonal transform profile to each pixel of the multi-band image data. Reference numeral 309 denotes an orthogonalized image storage unit that temporarily stores the orthogonally transformed image data in the third signal format.

Reference numeral 310 denotes an orthogonal transform inverse transform execution unit that recovers signal values of the multi-band image from orthogonally transformed signal values. It is to be noted that the image processing apparatus 303 may omit the orthogonalized image storage unit 309 and run the orthogonal transform execution unit 308 each time orthogonally transformed pixel data is required.

In this embodiment, an orthogonal transform matrix obtained from principal component analysis of the input image is used to convert the input image. Therefore, the term "orthogonal transform" is used in the names and description of the blocks 307 to 310. However, this is only for the convenience of description, and the conversion method used in the present invention is not limited to principal component analysis or orthogonal transform as long as the correlation between the channels of the input multi-band image data can be reduced. When other conversion methods are used, the names and description of the blocks may be modified accordingly.

Reference numerals 311 to 314 are components for LUT generation. That is, a color separation LUT is generated in which input signal values are pixel values of the orthogonally transformed image data in the third signal format, and output values are color separation signal values in the second signal format to be used in the image output apparatus 302. Reference numeral 311 denotes a color separation LUT grid point arrangement determination unit that determines the number of grid points and the grid point arrangement of the color separation LUT from the orthogonally transformed image data. Reference numeral 312 denotes a color separation LUT used grid point determination unit that determines whether or not each grid point of the color separation LUT is used one or more times when the input image is processed. Reference numeral 313 denotes a color separation LUT grid point output value determination unit that determines color separation signal values corresponding to input signal values of each grid point of the color separation LUT. Reference numeral 314 denotes a color separation LUT storage unit that temporarily stores the generated color separation LUT.

Reference numeral 315 denotes a color separation execution unit that applies the color separation LUT to the orthogonally transformed image in the third signal format and generates color-separated image, that is, image data in the second signal format. Reference numeral 316 denotes a color-separated image output unit that adds necessary data such as print control information to the color-separated image and outputs the image in a form capable of being output by the image output apparatus 302.

Reference numeral 317 denotes an image conversion profile input/output unit that has a function of outputting the orthogonal transform profile and the color separation LUT in predetermined reusable formats to an external storage device (not shown), and a function of reading the orthogonal transform profile and the color separation LUT stored in the external storage device. The image conversion profile input/output unit 317 temporarily stores the read orthogonal transform profile and color separation LUT in the orthogonal transform profile storage unit 307 and the color separation LUT storage unit 314, respectively.

Reference numeral 318 denotes a patch image input unit that inputs a color patch image. The patch image input unit 318 controls the multi-band image acquisition apparatus 301 or a storage device associated therewith to input multi-band data, as color information about the patch image, to the image processing apparatus 303. Reference numeral 319 denotes a patch image average computation unit that generates patch data by analyzing the multi-band data of the patch image and computing an average pixel value of each patch area for each channel.

Reference numeral 320 denotes a color separation signal generation unit that converts any multi-band pixel values into color separation signal values, and consists of a color prediction printer model 321 and a printer model inversion unit 322. The color prediction printer model 321 estimates, based on the correspondence between predetermined patch data and its multi-band data, multi-band pixel values to be reproduced by any color separation signal values. The printer model inversion unit 322 repeatedly runs the color prediction printer model 321 as an inverse function to search for color separation signal values that best reproduce any multi-band pixel values.

Image Conversion Processing

Before describing the image conversion processing in this embodiment, implementations of the multi-band image acquisition apparatus 301 and the image output apparatus 302 in this embodiment will be briefly described.

The following description will be made on the assumption that a six-channel multi-band camera having the spectral sensitivity as shown in the upper diagram of FIG. 1 for each channel is used as the multi-band image acquisition apparatus 301 in this embodiment. As long as sufficient multi-band data for reproducing spectral characteristics of an object can be acquired, the multi-band image acquisition apparatus 301 may acquire more or less than six channels, and may also take a form other than a camera, such as a multi-band scanner.

The multi-band camera in this embodiment uses a pigment filter as a filter for each channel, so that a relatively large overlap exists in transmitted band ranges of adjacent channels. Since this embodiment focuses the attention on the correlation of signals of the channels, a filter insusceptible to noise with a wide transmitted band range may be selected as the filter for each channel. However, any filters may be used as long as a signal value of each channel is not completely independent from each other and can be converted into a less correlated signal in the orthogonal transform execution unit 308.

Pixel values of an image taken by the multi-band camera are much influenced by a lighting environment as well as by the spectral reflectance of the object. Therefore, it is assumed in this embodiment that images are taken with the multi-band camera under the same conditions in all aspects, including the lighting environment.

Further, the following description will be made on the assumption that a color ink-jet printer with colorants of seven colors, cyan (C), magenta (M), yellow (Y), red (R), green (G), blue (B), and black (K), is used as the image output apparatus 302 of the present embodiment. The image output apparatus 302 outputs an image on a predetermined recording medium based on color separation signals of the seven colors, C, M, Y, R, G, B, and K, output by the image processing apparatus 303. As long as spectral characteristics of an image can be reproduced, the number and combination of colorants equipped in the image output apparatus 302 are not limited to this, and the output apparatus is not limited to a color ink-jet printer. An electrophotographic printer, a dye sublimation printer, or even an apparatus that generates a printing plate based on color separation signals may be used as the image output apparatus 302.

As an object to be output in this embodiment, a water-color painting about 25 cm high by 23 cm wide is assumed.

Figure 3:
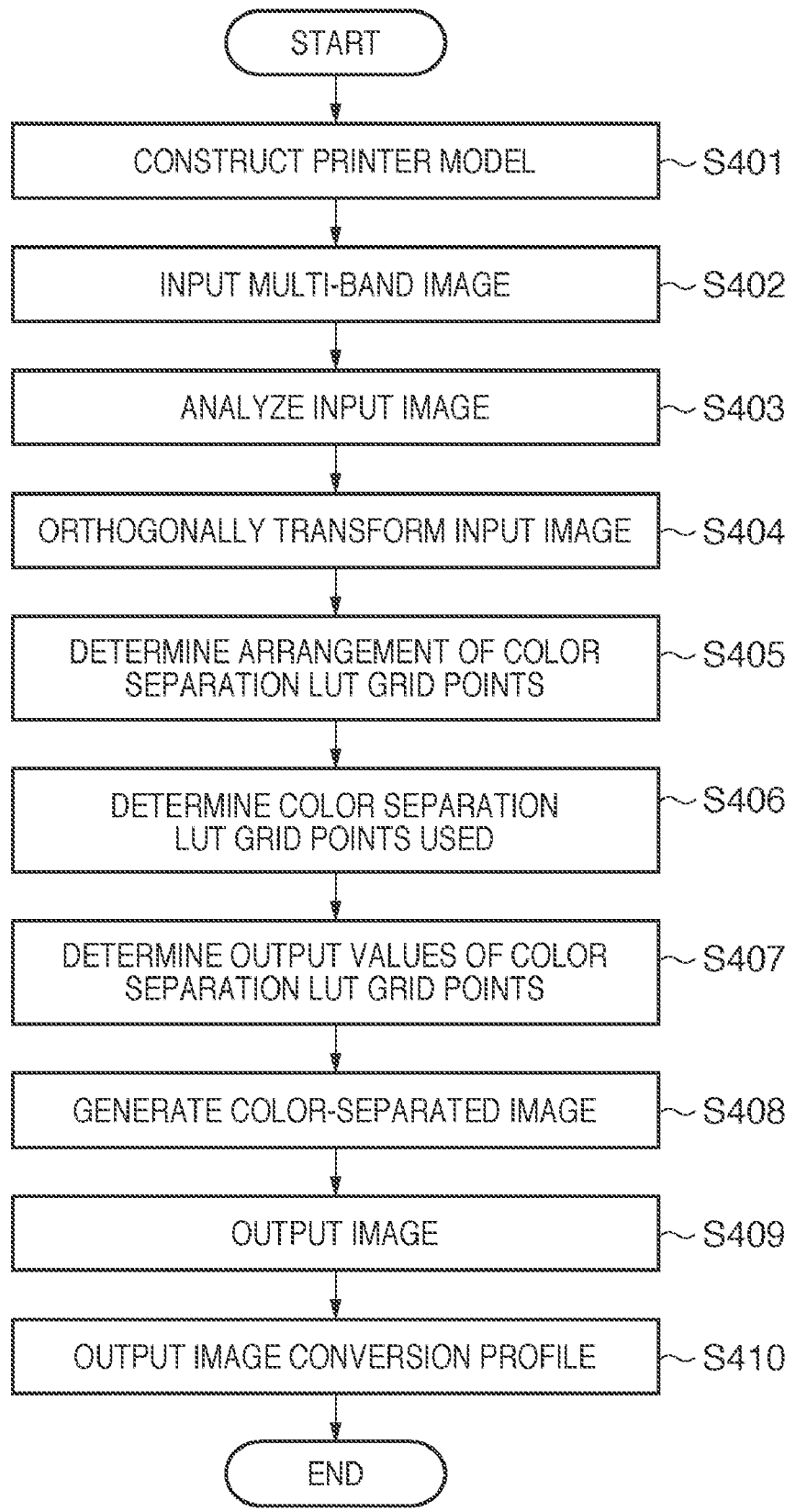
FIG. 3 is a flowchart showing exemplary image conversion processing in the first embodiment.

The image conversion processing in this embodiment will be described in detail below using a flowchart of FIG. 3.

Figure 4:
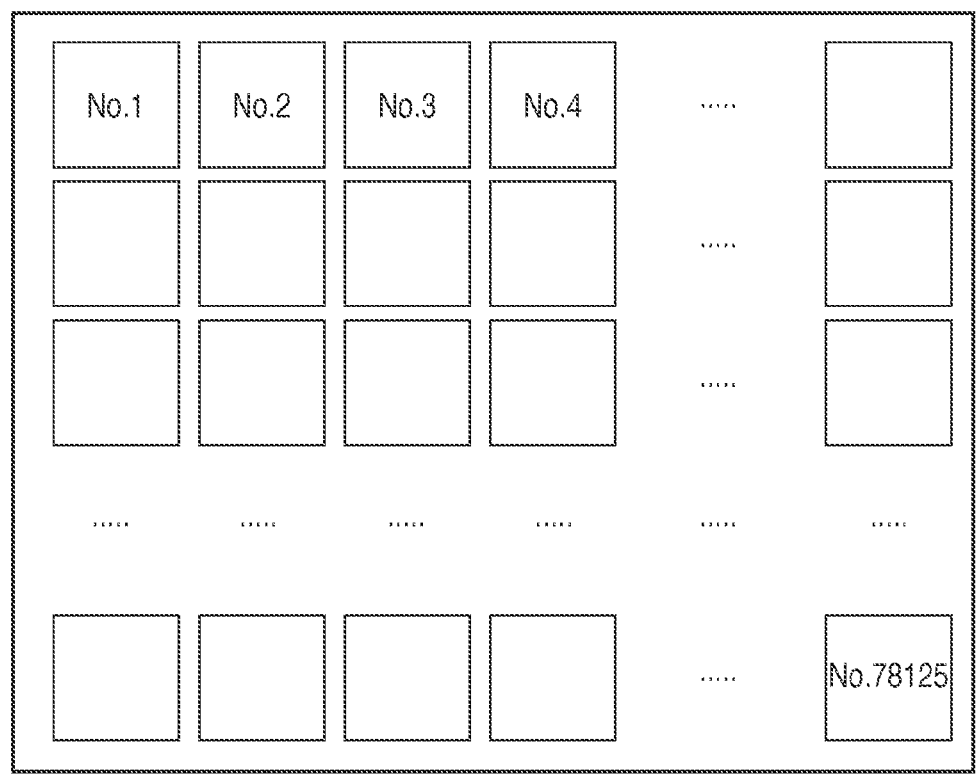
FIG. 4 is a diagram showing an example of a color patch image and corresponding amounts of ink in the first embodiment.

First, in S401, the color separation signal generation unit 320 performs printer model construction processing. That is, based on patch image data, the color separation signal generation unit 320 constructs the color prediction printer model 321 as follows. The color separation signal generation unit 320 first uses the image output apparatus 302 to output a color patch image that consists of a predetermined color patch group. A diagram in the upper portion of FIG. 4 shows an example of the color patch image, and a table in the lower portion shows amounts of colorants for each color patch. That is, color patches of all combinations of amounts of colorants of the colors varied by 25% of the maximum amount of use as shown in the table below are output to rectangular portions No. 1 to No. 78125 in the diagram above.

The multi-band image acquisition apparatus 301 images the output color patch image. The imaged multi-band image data has six-channel 16-bit data for each pixel and is read into the image processing apparatus 303 via the patch image input unit 318. The read image data is converted into six-channel average pixel value data for each of the 78125 color patches in the patch image average computation unit 319.

The color prediction printer model 321 is based on the data computed by the patch image average computation unit 319. The color prediction printer model 321 is constructed by estimating multi-band pixel values to be obtained when the image output apparatus 302 outputs any combinations of amounts of colorants and the multi-band image acquisition apparatus 301 images the combinations. This estimation uses an expression of the Cellular Yule-Nielsen Spectral Neugebauer Model. The color prediction method used for the printer model construction is not limited to the Cellular Yule-Nielsen Spectral Neugebauer Model. Also, the number of color patches and their arrangement are not limited to the example shown in FIG. 4 but may be modified according to the printer model construction method employed.

Once the printer model is constructed as above, the image processing apparatus 303 performs multi-band image input processing in S402. That is, the multi-band image acquisition apparatus 301 acquires multi-band image data to be subjected to the image conversion processing. As described above, this imaging is performed under the same conditions as the imaging of the patch image in S401. The imaged six-channel 16-bit multi-band image data is input to the image processing apparatus 303 via the multi-band image input unit 305.

Next, in S403, the image processing apparatus 303 performs input image analysis processing, that is, generates the orthogonal transform profile for the input multi-band image data, in the multi-band image analysis unit 306 as follows. The image processing apparatus 303 first computes the average of all pixels for each channel of the multi-band image data. The image processing apparatus 303 then performs what is called principal component analysis, in which the average for each channel is subtracted from signal values of part or all of the pixels of the image and a covariance matrix for the image data after the subtraction is computed. This covariance matrix is a 6 by 6 matrix and can be used as an orthogonal transform matrix that causes the correlation between the channels of the multi-band image data after the subtraction to be lost. As to the number of samples, the tradeoff between the computational load of computing the orthogonal transform profile and the conversion accuracy is taken into account. That is, to improve the accuracy, it is desirable to compute the covariance matrix by increasing the number of samples or by using data of all the pixels depending on the processing capability of the computer. The combination of the average for each channel and the covariance matrix computed is stored in the orthogonal transform profile storage unit 307.

Next, in S404, the orthogonal transform execution unit 308 performs orthogonal transform processing on the input image. That is, the orthogonal transform execution unit 308 applies the average for each channel and the covariance matrix stored in the orthogonal transform profile storage unit 307 to the multi-band image and generates orthogonally transformed image data. This yields image data from the first to sixth principal components. Then, for each principal component, the lowest signal value among all the pixels is subtracted to adjust the position of the origin of the principal component space so that the lowest of the signal values of each principal component becomes 0. The generated image data is stored in the orthogonalized image storage unit 309. The values added to the axes in adjusting the origin are stored as an origin adjustment vector in the orthogonal transform profile storage unit 307. The value of each component of this origin adjustment vector is equal to the lowest value of each principal component with its sign reversed.

Figure 5:
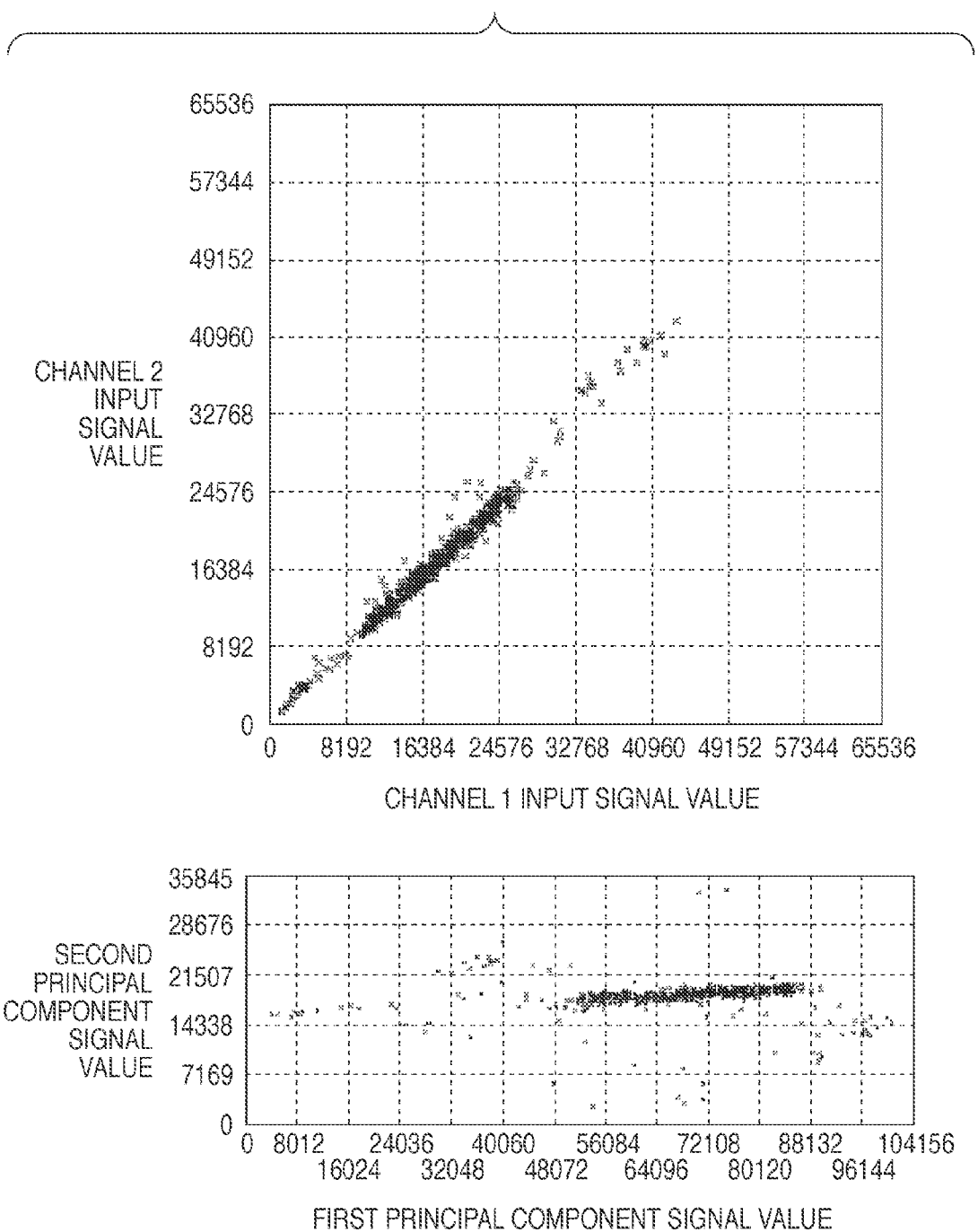
FIG. 5 is a diagram showing exemplary correlations between components at sampling points of an input multi-band image in the first embodiment.

In this embodiment, 575 points arranged at intervals of about 1 cm as a grid of 25 points high by 23 points wide have been sampled from the input multi-band image, and the covariance matrix has been computed based on the pixel data at these 575 points. An upper diagram in FIG. 5 shows an example that plots the correlation between signal values of channels 1 and 2 before the orthogonal transform at the 575 points sampled in this manner. A lower diagram in FIG. 5 shows an example that plots the correlation between values of the first and second principal components after the orthogonal transform at the same points. According to the upper diagram in FIG. 5, it can be seen that the distribution of the pixels in the multi-band image stretches far in the diagonal direction in the input six-dimensional space, indicating a strong correlation between the channels, and the first principal component has components close to the diagonal line in the input six-dimensional space. In this case, if a color separation LUT is generated across the entire area of the input color space, grid points actually used are mostly in a small area corresponding to the first principal component while the most of the remaining area is not used. Therefore in this embodiment, in S405 to S407 below, the image processing apparatus 303 generates a color separation LUT for each principal component after the orthogonal transform as shown in the lower diagram in FIG. 5. In this manner, an LUT can be generated in an efficient color space with a reduced unused area.

In S405, the color separation LUT grid point arrangement determination unit 311 determines the number and arrangement of grid points of the color separation LUT such that all the pixels of the orthogonally transformed image can be processed as input values. Details of the processing of determining the arrangement of the color separation LUT grid points will be described later.

Next, in S406, the color separation LUT used grid point determination unit 312 determines whether or not each grid point of the LUT is used one or more times if all the pixels of the orthogonally transformed image are input to the LUT.

In S407, for all grid points determined to be used one or more times in S406, the color separation LUT grid point output value determination unit 313 determines a color separation signal value, which is an output signal value, as follows. First, the color separation LUT grid point output value determination unit 313 runs the orthogonal transform inverse transform execution unit 310 to compute multi-band pixel values from input signal values of the grid points. This inverse transform is performed by subtracting the origin adjustment vector read out from the orthogonal transform profile storage unit 307 from the signal values of the grid points, performing transform with an inverse matrix of the orthogonal transform matrix, and adding the average for each channel. The color separation LUT grid point output value determination unit 313 then runs the color separation signal generation unit 320 to derive color separation signal values that best reproduce the computed multi-band pixel values. This processing is performed by the printer model inversion unit 322 repeatedly running the color prediction printer model 321 based on the Newton's iterative method. The printer model inversion method is not limited to the Newton's iterative method but various optimization methods and search methods may be applied. For, example, the simplex method and the particle swarm optimization method may be used. For grid points determined not to be used at all in S406, searching for color separation signal values is not performed in order to reduce the computational load, and a dummy value is set indicating that no output signal value is set. The color separation LUT generated in this manner is temporarily stored in the color separation LUT storage unit 314.

Once the color separation LUT is generated as above, in S408, the color separation execution unit 315 applies the color separation LUT to the orthogonally transformed image data and generates a color-separated image having seven-channel color separation signals for each pixel. In S409, the color-separated image output unit 316 sends the color-separated image and necessary print control information to the image output apparatus 302. Thus the image output apparatus 302 outputs an image that reproduces the spectral characteristics of the input multi-band image. The image processing apparatus 303 may store the color-separated image and the necessary print control information in an external storage device (not shown) so that the data may be sent from the external storage device to the image output apparatus 302.

In S410, the image conversion profile input/output unit 317 outputs the orthogonal transform profile and the color separation LUT in predetermined reusable forms to an external storage device (not shown). That is, the image conversion profile input/output unit 317 stores the following items as the image conversion profile 304 in the external storage device: the average for each channel, the covariance matrix, and the origin adjustment vector stored in the orthogonal transform profile storage unit 307; and the color separation LUT stored in the color separation LUT storage unit 314.

In this manner, the image processing apparatus 303 stores the orthogonal transform profile and the color separation LUT as the image conversion profile 304. If the same image is to be output in the future, the stored image conversion profile 304 can be read and used. That is, the image conversion profile input/output unit 317 reads the image conversion profile 304 into the orthogonal transform profile storage unit 307 and the color separation LUT storage unit 314. This eliminates the necessity of the above-described generation of the orthogonal transform profile and the color separation LUT in S403 and S405 to S407 for this image, allowing the image to be output in a fewer number of process steps.

If the input image has been modified, the image processing apparatus 303 extracts grid points newly used for the modified portion in S406, and determines output signal values for the new grid points in S407. In this manner, the image processing apparatus 303 can update the color separation LUT in a fewer number of process steps and convert the modified input image. Specifically, the color separation LUT used grid point determination unit 312 extracts grid points used one or more times with the modified image, and computes output values and updates the LUT only for ones among the extracted grid points for which a dummy output signal value has been set in the read color separation LUT. Thus, in the case of reading the existing image conversion profile like this, the reduction of the number of process steps is realized because the generation of the orthogonal transform profile in S403 and the processing of determining the arrangement of the color separation LUT grid points in S405 described above can be eliminated. However, if the input image has been so much modified to significantly change the result of the principal component analysis, the normal processing may be performed from the viewpoint of the conversion accuracy.

Processing of Determining Arrangement of Color Separation LUT Grid Points

Figure 6:
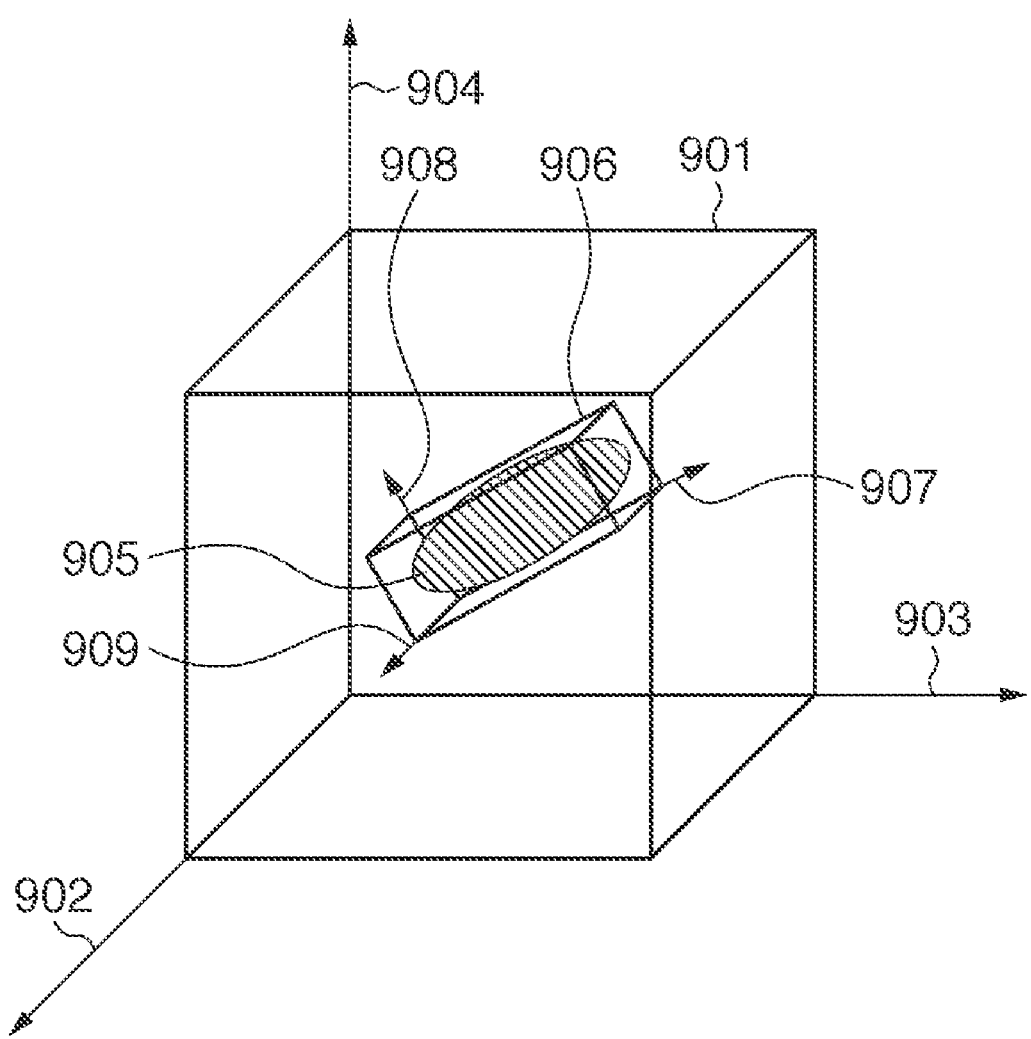
FIG. 6 is a diagram showing an exemplary relationship among a color separation LUT generated in the first embodiment, a general color separation LUT, and a pixel distribution of an input multi-band image.

The above processing of determining the arrangement of the color separation LUT grid points in S405 will be described in detail below. FIG. 6 schematically shows the relationship between a general color separation LUT in which input values are pixel values of an input multi-band image, and the color separation LUT in this embodiment in which input values are pixel values of an orthogonally transformed image. In FIG. 6, reference numeral 901 denotes an input space of the general color separation LUT. Reference numerals 902 to 904 denote input axes of the LUT corresponding to the channels 1 to 3 of the input multi-band image, respectively, and axes corresponding to the channels 4 to 6 are not shown. Reference numeral 905 denotes a pixel distribution area of the input multi-band image. As described above, the pixel distribution of a multi-band image with a high channel correlation tends to concentrate around the diagonal line in the input six-dimensional space, and most of the space of the general color separation LUT 901 is an area where no pixels exist.

Reference numeral 906 denotes an input space of the color separation LUT in this embodiment in which input values are pixel values of the orthogonally transformed image. Reference numerals 907 to 909 denote input axes of the LUT corresponding to the first to third principal components after the orthogonal transform, respectively. Axes corresponding to the fourth to sixth principal components are not shown.

In this embodiment, as illustrated by 906 in FIG. 6, the grid point arrangement of the color separation LUT is determined such that the input axes are the principal components after the orthogonal transform and at least all the pixels of the input multi-band image are covered.

An upper table in FIG. 7 shows the dynamic range, the number of grid points, and the grid point interval, for each axis of the general color separation LUT. Nine grid points are arranged for 16-bit input pixel values of each channel, and the interval between grid points is 8192. In this case, the total number of grid points is sixth power of nine, that is, 531441. In contrast, a lower table in FIG. 7 shows the dynamic range, the number of grid points, and the grid point interval, for each axis of the color separation LUT generated in this embodiment. In the case of the grid points in this embodiment, for each input axis, the grid interval is set to a uniform interval smaller than the grid interval 8192 of the general LUT, and the number of grid points is set to the smallest value. The signal values of the grid points are arranged at regular integer intervals, where the maximum value and the minimum value of each principal component of the orthogonally transformed input image correspond to grid points at both ends. For example, the minimum value and the maximum value of the first principal component are 0 and 104147.3, respectively, and 14 grid points are necessary. Therefore, the grid point interval is obtained by dividing 104148 by 13, which results in 8011.38. The input signal values of the grid points of the first principal component axis are set to the values 0, 8011, 16023, 24034, ..., 104148.

As such, the color separation LUT generated in this embodiment has a shape that covers at least the input image, and the generated LUT includes a total of 25200 grid points. Therefore, the data size is reduced to ½1st compared with 531441 grid points of the general LUT. Also, the grid point interval of this color separation LUT is set equal to or narrower than that of the general LUT, which is advantageous from the aspect of the conversion accuracy.

Thus, in this embodiment, the reduction in data size of the color separation LUT allows the reduction in memory size required for the image conversion apparatus. Also, the image conversion processing can be accelerated because accesses to the LUT are facilitated. If a sufficient margin arises for the memory size or the processing speed, the number of grid points of the LUT may be increased to improve the conversion accuracy.

In this embodiment, an example has been illustrated in which the grid points are set so that each input axis has a uniform grid point interval. However, an LUT with varying grid point intervals may be generated by analyzing a bias in the pixel distribution of the orthogonally transformed input image. For example, a narrow grid point interval may be set for an LUT area with dense pixels, while a wide grid point interval may be set for an LUT area with sparse pixels. This allows highly accurate conversion to be performed for main portions of the input image.

If it is determined that a lower-level principal component has a sufficiently small dynamic range for an assumed grid point interval and has small influence on the reproduction accuracy of the spectral characteristics, the values of that principal component may be set to a fixed value and the number of dimensions of the color separation LUT may be reduced. For example, if the dynamic range of the sixth principal component is not greater than one-eighth of the grid point interval threshold 8192, the values of the sixth principal component may be treated as a fixed value equal to an average of all the pixels, and a five-dimensional color separation LUT with input axes corresponding to the first to fifth principal components may be generated. If the dynamic ranges of a plurality of principal components are sufficiently small, all the corresponding principal component axes may be omitted. However, if this results in an extreme reduction of the number of dimensions of the LUT, adequate performance may not be obtained as the multi-band image conversion apparatus. For example, if the number of dimensions of the LUT is reduced to three, it will be hard to make differentiation from color conversion in a normal RGB color space. Therefore, the number of dimensions N should be 3<N, and the number of dimensions M should be 3<M≦N, where N denotes the number of dimensions of the input multi-band image data in this embodiment and M denotes the number of dimensions of the image data after principal component analysis consisting of the first to M-th principal components.

Thus, as described above, according to this embodiment, the image processing apparatus 303 uses principal component analysis to convert N-dimensional (3<N) input multi-band image data into an M-dimensional (3<M≦N) data format with a low correlation between bands. The image processing apparatus 303 then generates a color separation LUT that takes the converted image data as input values. The image processing apparatus 303 applies the color separation LUT to the converted image data and generates a color-separated image, so that the spectral characteristics of the multi-band image of an imaged object can be faithfully reproduced on a printed matter. Since the color separation LUT is constructed with a minimum size that covers all pixels of the input image, the spectral color reproduction of the multi-band image can be performed with a smaller memory size and a high speed and accuracy.

<Second Embodiment>

A second embodiment according to the present invention will be described below. In the above-described first embodiment, an example has been illustrated in which the color separation LUT is generated based on the multi-band imaged data of the color patch image. In the second embodiment, an example will be illustrated in which the color separation LUT is generated based on the spectral characteristics of the color patch image.

System Configuration

Figure 8:
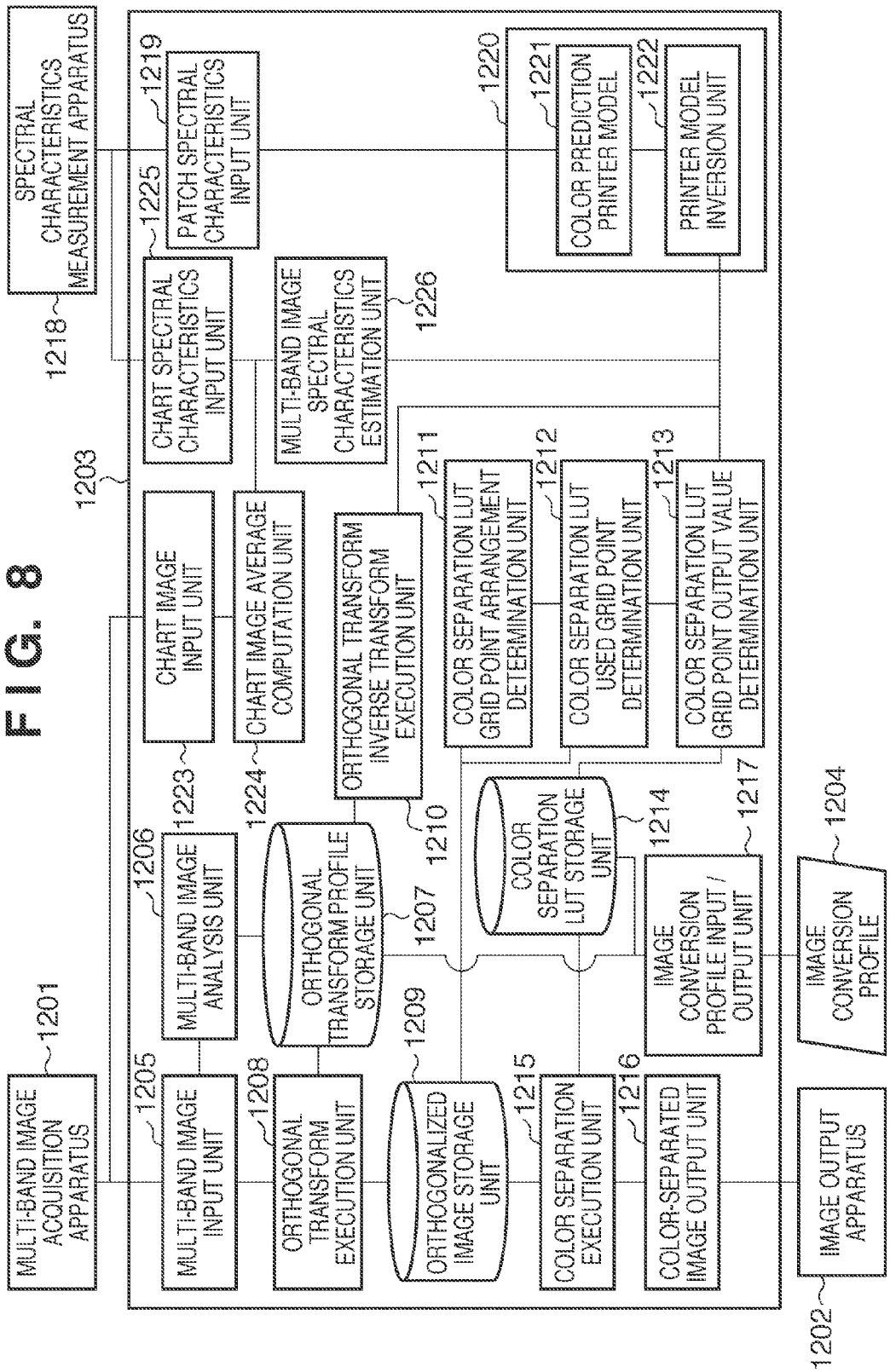
FIG. 8 is a block diagram showing an exemplary configuration of an image conversion system in a second embodiment.

FIG. 8 is a block diagram showing a configuration of an image conversion system in the second embodiment. Functions of the blocks 1201 to 1217 in FIG. 8 will not be described because they are the same as the blocks 301 to 317 shown in FIG. 2 for the first embodiment described above.

Reference numeral 1218 denotes a spectral characteristics measurement apparatus capable of measuring the spectral characteristics of color patches. Reference numeral 1219 denotes a patch spectral characteristics input unit for controlling the spectral characteristics measurement apparatus 1218 or a storage device associated therewith to input the measured spectral characteristics data of the color patches that consist of a first color patch group to the image processing apparatus 1203. Reference numeral 1220 denotes a color separation signal generation unit that converts any spectral characteristics into color separation signal values, and includes a color prediction printer model 1221 and a printer model inversion unit 1222. The color prediction printer model 1221 estimates, from the patch data, spectral characteristics to be reproduced by any color separation signal values. The printer model inversion unit 1222 repeatedly runs the color prediction printer model 1221 as an inverse function to search for color separation signal values that best reproduce any spectral characteristics.

Reference numeral 1223 denotes a chart image input unit that controls the multi-band image acquisition apparatus 1201 or a storage device associated therewith to input multi-band data, as color information about a chart image that consist of a second color patches, to the image processing apparatus 1203. The multi-band data about the chart image is used for estimating the spectral characteristics of a multi-band image as described later. Reference numeral 1224 denotes a chart image average computation unit that analyzes the multi-band data of the chart image, computes an average pixel value of each color patch area for each channel, and generates multi-band pixel value data of each color patch. Reference numeral 1225 denotes a chart spectral characteristics input unit for controlling the spectral characteristics measurement apparatus 1218 or a storage device associated therewith to input, to the image processing apparatus 1203, spectral characteristics data of each color patch of the chart image input from the chart image input unit 1223. Reference numeral 1226 denotes a multi-band image spectral characteristics estimation unit that estimates the spectral characteristics from pixel data of the multi-band image.

The second embodiment uses, as predetermined color patch groups, the first color patch group for generating the color prediction printer model, and the second color patch group for generating a conversion expression for converting the pixel values of the multi-band image into the spectral reflectance. Hereinafter, for convenience of distinction between these color patch groups, the first color patch group will be referred to as color patches and the second color patch group will be referred to as a color chart. Although the second embodiment will be described on the assumption that the first color patch and the second color patch are different, they may be the same color patch group.

Image Conversion Processing

The image conversion processing in the second embodiment will be described in detail below using a flowchart of FIG. 9. The following description will be made on the assumption that the multi-band image acquisition apparatus 1201 and the image output apparatus 1202 used in the second embodiment are of similar configurations as used in FIG. 2 of the first embodiment described above. As in the first embodiment, implementations of these input apparatus and output apparatus in the second embodiment are not limited to this example.

The following description will be made on the assumption that the spectral characteristics measurement apparatus 1218 used in the second embodiment measures the reflectance of each color patch for each wavelength at every 10 nm in the range of 380 nm to 730 nm and outputs the reflectance as 36-dimensional spectral reflectance data. Again, as to the spectral characteristics measurement apparatus 1218, the measuring method and the format of the spectral reflectance data are not limited to this example.

FIG. 9 is a flowchart showing exemplary image conversion processing performed in the image processing apparatus 1203.

First, in S1301, the color separation signal generation unit 1220 performs printer model construction processing. That is, based on the spectral characteristics data of the color patches, the color separation signal generation unit 1220 constructs the color prediction printer model 1221 as follows. The image output apparatus 1202 first outputs a predetermined color patch image. The color patch image output here is similar to the one in S401 of the first embodiment described above. The spectral characteristics measurement apparatus 1218 then measures the output color patch image. The measured spectral reflectance data is read as the spectral characteristics data into the image processing apparatus 303 via the patch spectral characteristics input unit 1219.

The color prediction printer model 1221 is based on the read patch spectral characteristics data, and it is constructed by estimating the spectral reflectance to be obtained when the image output apparatus 1202 outputs any combinations of amounts of colorants. This estimation uses an expression of the Cellular Yule-Nielsen Spectral Neugebauer Model, for example.

Once the printer model is constructed as above, in S1302, the image processing apparatus 1203 generates a spectral characteristics estimation matrix as a conversion matrix for estimating the spectral characteristics from pixel values of a multi-band image. Here, imaging by the multi-band image acquisition apparatus 1201 and measurement by the spectral characteristics measurement apparatus 1218 are performed for a predetermined color patch group (a chart image). The measurement data of these apparatuses is sent to the multi-band image spectral characteristics estimation unit 1226 via the chart image input unit 1223 and the chart spectral characteristics input unit 1225. The multi-band image spectral characteristics estimation unit 1226 associates the multi-band pixel value data of each color patch and the spectral reflectance data and generates the spectral characteristics estimation matrix as a conversion expression for converting the pixel values of the multi-band image into the spectral reflectance with Winner estimation.

Although it is assumed here to use a color chart including color patches of 96 colors as the color patch group, other forms of color patch groups may be used as long as the spectral characteristics can be estimated with sufficient accuracy. If the spectral reflectance of each color patch is available from catalog data or the like, that value may be read as the data. Further, the estimation method is not limited to Winner estimation or matrix transform, but other methods may be used to estimate the spectral characteristics from the multi-band pixel value data.

S1303 to S1307 that follow will not be described in detail here, in which the image processing apparatus 1203 performs the same processing as in S402 to S406 of the first embodiment described above. That is, the image processing apparatus 1203 performs the processing of inputting a multi-band image to be converted, analyzing the input multi-band image, orthogonally transforming the input image, determining the arrangement of the color separation LUT grid points, and determining grid points used in the color separation LUT.

In S1308, for all grid points determined to be used one or more times in S1307, the color separation LUT grid point output value determination unit 1213 determines a color separation signal value, which is an output signal value, as follows. First, the color separation LUT grid point output value determination unit 1213 runs the orthogonal transform inverse transform execution unit 1210 to compute multi-band pixel values from input signal values of the grid points. This inverse transform is performed by converting the signal values of the grid points with an inverse matrix of the orthogonal transform matrix read out from the orthogonal transform profile storage unit 1207 and then adding the average of each channel read out in the same manner. The color separation LUT grid point output value determination unit 1213 then runs the multi-band image spectral characteristics estimation unit 1226 to compute the spectral reflectance from the computed multi-band pixel values based on the spectral characteristics estimation matrix generated in S1302. The color separation LUT grid point output value determination unit 1213 then runs the color separation signal generation unit 1220 to derive color separation signal values that best reproduce the computed spectral reflectance. As in S407 of the first embodiment, this processing is performed by the printer model inversion unit 1222 repeatedly running the color prediction printer model 1221. For grid points determined not to be used at all in S1207, searching for color separation signals is not performed in order to reduce the computational load, and a dummy value is set indicating that no output signal value is set. The color separation LUT generated in this manner is temporarily stored in the color separation LUT storage unit 1214.

S1309 to S1311 that follow will not be described in detail here, in which the image processing apparatus 1203 performs the same processing as in S408 to S410 of the first embodiment described above. That is, the image processing apparatus 1203 performs the processing of generating a color-separated image, outputting the image, and outputting the image conversion profile.

As in the first embodiment, the image processing apparatus 1203 in the second embodiment can output the same image in fewer process steps in future by maintaining the output image conversion profile. Also as in the first embodiment, if the input image has been modified, the image processing apparatus 1203 can eliminate the generation of the orthogonal transform profile in S1304 and the processing of determining the arrangement of the color separation LUT grid points in S1304, realizing a reduction in the number of process steps.

In the processing of outputting the image conversion profile in S1311, it is also effective to include, in the image conversion profile to be output, the conversion expression for estimating the spectral reflectance generated by the multi-band image spectral characteristics estimation unit 1226. In this manner, when performing image conversion with a modified input image, the image processing apparatus 1203 can use the previously generated conversion expression to estimate the spectral characteristics, thereby eliminating the processing of generating the spectral characteristics estimation matrix in S1302.

Thus, as described above, according to the second embodiment, the color separation LUT is constructed based on the spectral characteristics of each grid point. Therefore, in addition to the same advantages as in the above-described first embodiment, matching is possible that takes into account various spectral-based visual and optical characteristics, such as a color matching function. Further, since the grid points of the color separation LUT are arranged in parallel with each principal component of the input image, and since close grid intervals can be set, LUT grid points closer to the first principal component can be used for the processing. Therefore, the image processing apparatus 1203 can reduce errors in estimating the spectral characteristics from the input signal values of the grid points, enabling image conversion with higher accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-223462, filed Sep. 28, 2009 which is hereby incorporated by reference herein in its entirety.

What is claimed is:

1. An image processing apparatus that separates image data in an N-dimensional first signal format, where 3<N, into image data in a second signal format, the second signal format indicating the amount of a colorant of each color used in an image output apparatus, the apparatus comprising:
    an input unit configured to acquire input image data in the first signal format;
    a conversion unit configured to convert the input image data in the first signal format into image data in an M-dimensional third signal format, where 3<M≦N; and
    a color separation unit configured to separate the converted image data in the third signal format into image data in the second signal format, using an M-dimensional color separation LUT whose input values are in the third signal format and whose output values are in the second signal format, wherein
    with respect to a pixel distribution, a correlation between each component of the converted image data in the third signal format is lower than a correlation between each component of the input image data in the first signal format.

2. The apparatus according to claim 1, wherein the conversion unit converts the input image data into the image data in the M-dimensional third signal format by performing principal component analysis on the input image data to obtain the first to M-th principal components.

3. The apparatus according to claim 1, wherein the number of dimensions M is equal to the number of dimensions N.

4. The apparatus according to claim 1, further comprising:
    a color patch input unit configured to acquire, in the first signal format, color information about a color patch group output by the image output apparatus on a recording medium;
    a model generation unit configured to generate a printer model indicating a correspondence between the color patch group and the color information about the color patch group acquired by the color patch input unit; and
    an LUT generation unit configured to use the printer model to generate the color separation LUT based on the converted image data in the third signal format.

5. The apparatus according to claim 4, wherein the LUT generation unit comprises:
    an arrangement determination unit configured to determine a grid point arrangement of the color separation LUT so that all pixels of the converted image data in the third signal format are covered in a color space according to the third signal format;
    an inverse transform unit configured to convert a value in the third signal format into a value in the first signal format for each grid point of the color separation LUT; and
    an output value determination unit configured to determine, based on the printer model, a value in the second signal format corresponding to the value in the first signal format resulting from conversion by the inverse transform unit.

6. The apparatus according to claim 5, further comprising:
    a determination unit configured to determine, for each grid point of the color separation LUT determined by the arrangement determination unit, whether the grid point is used when the converted image data in the third signal format is color-separated with the color separation LUT, wherein
    for each grid point determined by the determination unit to be used, the inverse transform unit converts a value in the third signal format into a value in the first signal format.

7. The apparatus according to claim 1, comprising:
a measurement unit capable of measuring spectral characteristics of a color patch;
a model generation unit configured to generate a printer model indicating a correspondence between a first color patch group output by the image output apparatus on a recording medium and spectral characteristics of the first color patch group measured by the measurement unit;
a color patch input unit configured to acquire, in the first signal format, color information about a second color patch group;
a computation unit configured to compute a conversion expression for converting a value in the first signal format into a spectral reflectance based on a correspondence between spectral characteristics of the second color patch group measured by the measurement unit and the color information about the second color patch group acquired by the color patch input unit; and
an LUT generation unit configured to use the printer model and the conversion expression to generate the color separation LUT based on the converted image data in the third signal format.

8. The apparatus according to claim 1, further comprising:
a measurement unit capable of measuring spectral characteristics of a color patch;
a color patch input unit configured to acquire, in the first signal format, color information about a first color patch group output by the image output apparatus on a recording medium;
a model generation unit configured to generate a printer model indicating a correspondence between the first color patch group and spectral characteristics of the first color patch group measured by the measurement unit;
a computation unit configured to compute a conversion expression for converting a value in the first signal format into a spectral reflectance based on a correspondence between spectral characteristics of a second color patch group measured by the measurement unit and color information about the second color patch group acquired by the color patch input unit; and
an LUT generation unit configured to use the printer model and the conversion expression to generate the color separation LUT based on the converted image data in the third signal format.

9. The apparatus according to claim 8, wherein the LUT generation unit comprises:

an arrangement determination unit configured to determine a grid point arrangement of the color separation LUT so that all pixels of the input image data converted into the third signal format are covered in a color space according to the third signal format;
an inverse transform unit configured to convert a value in the third signal format into a value in the first signal format for each grid point of the color separation LUT;
a spectral reflectance estimation unit configured to estimate, based on the conversion expression, a spectral reflectance of the value in the first signal format resulting from conversion by the inverse transform unit; and
an output value determination unit configured to determine, based on the printer model, a value in the second signal format corresponding to the estimated spectral reflectance.

10. An image processing method for separating image data in an N-dimensional first signal format, where 3<N, into image data in a second signal format, the second signal format indicating the amount of a colorant of each color used in an image output apparatus, the method comprising:
acquiring input image data in the first signal format;
converting the input image data in the first signal format into image data in an M-dimensional third signal format, where $3 < M \leq N$; and
separating the converted image data in the third signal format into image data in the second signal format, using an M-dimensional color separation LUT whose input values are in the third signal format and whose output values are in the second signal format, wherein
with respect to a pixel distribution, a correlation between each component of the converted image data in the third signal format is lower than a correlation between each component of the input image data in the first signal format.

11. The method according to claim 10, wherein the converting comprises converting the input image data into the image data in the M-dimensional third signal format by performing principal component analysis on the input image data to obtain the first to M-th principal components.

12. A computer program stored in a computer-readable storage medium for causing a computer to function as each of the units of the apparatus according to claim 1 when executed by the computer.

* * * * *